US012606307B2

(12) United States Patent
Vogel et al.

(10) Patent No.: US 12,606,307 B2
(45) Date of Patent: Apr. 21, 2026

(54) HUMAN AND/OR NON-HUMAN CARGO ATTACHMENT DEVICE FOR USE WITH A ROTORCRAFT

(71) Applicant: AIRBUS HELICOPTERS DEUTSCHLAND GMBH, Donauworth (DE)

(72) Inventors: Dominik Vogel, Langweid (DE); Christoph Heider, Rain Am Lech (DE); Stefan Salzburger, Augsburg (DE); Alexandru Dinca, Donauworth (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 857 days.

(21) Appl. No.: 17/967,489

(22) Filed: Oct. 17, 2022

(65) Prior Publication Data

US 2023/0159168 A1 May 25, 2023

(30) Foreign Application Priority Data

Nov. 23, 2021 (EP) .................................... 21400023

(51) Int. Cl.
  B64D 1/22 (2006.01)
  B33Y 80/00 (2015.01)
    (Continued)

(52) U.S. Cl.
  CPC ................ B64D 1/22 (2013.01); B33Y 80/00 (2014.12); B64C 27/04 (2013.01); B66C 1/22 (2013.01); B66C 1/34 (2013.01)

(58) Field of Classification Search
  CPC .... B64D 1/08; B64D 1/22; B66C 1/22; B66C 1/34
  See application file for complete search history.

(56) References Cited

U.S. PATENT DOCUMENTS

| 1,408,940 A | 3/1922 | Harley |
| 3,444,569 A | 5/1969 | Greenberg et al. |
| (Continued) | | |

FOREIGN PATENT DOCUMENTS

| CN | 205114816 U | 3/2016 |
| CN | 112047228 A | 12/2020 |
| (Continued) | | |

OTHER PUBLICATIONS

European Search Report for European Application No. EP 21400023. 4, Completed by the European Patent Office, Dated Apr. 13, 2022, 5 pages.

*Primary Examiner* — Sang K Kim

(74) *Attorney, Agent, or Firm* — BROOKS KUSHMAN P.C.

(57) ABSTRACT

A human and/or non-human cargo attachment device for a rotorcraft, comprising: a mounting interface with a mounting base carrier $11d$ that is removably attachable to an associated attachment for attachment to a rotorcraft rope or cable; a connecting member that is spaced apart from the mounting base carrier; and a plurality of lateral attachments which are connected to the mounting base carrier and the connecting member; wherein each lateral attachment of the plurality of lateral attachments forms a main lashing point for attachment of human external cargo and comprises an associated inner web that is connected to the mounting base carrier and the connecting member; and wherein the associated inner webs of the plurality of lateral attachments are spaced apart from each other in peripheral direction of the mounting base carrier and form a tube-shaped inner region.

15 Claims, 6 Drawing Sheets

(51) Int. Cl.

| | |
|---|---|
| B64C 27/04 | (2006.01) |
| B66C 1/22 | (2006.01) |
| B66C 1/34 | (2006.01) |

(56) References Cited

U.S. PATENT DOCUMENTS

| | | | |
|---|---|---|---|
| 3,467,346 A | | 9/1969 | Carson |
| 3,476,339 A | | 11/1969 | Pugh |
| 3,946,971 A | * | 3/1976 | Chadwick ................ B64D 1/08 |
| | | | 244/137.4 |
| 4,913,480 A | | 4/1990 | Yohe |
| 5,593,113 A | * | 1/1997 | Cox ......................... B64D 1/22 |
| | | | 294/82.26 |
| 5,836,548 A | | 11/1998 | Dietz et al. |
| 6,336,260 B1 | | 1/2002 | Mauthner |
| 6,598,831 B1 | | 7/2003 | Tardy |

| | | | |
|---|---|---|---|
| 10,398,939 B1 | | 9/2019 | Siegel |
| 12,269,712 B2 | * | 4/2025 | Heider ..................... B66C 1/36 |
| 2005/0250396 A1 | | 11/2005 | Hayles |
| 2006/0249330 A1 | | 11/2006 | Tardy |
| 2013/0154290 A1 | | 6/2013 | Betzler et al. |
| 2021/0047149 A1 | | 2/2021 | Mckay |

FOREIGN PATENT DOCUMENTS

| | | | |
|---|---|---|---|
| EP | 1100720 | A1 | 5/2001 |
| EP | 1646562 | A1 | 4/2006 |
| EP | 3037133 | B1 | 6/2018 |
| EP | 3781480 | A1 | 2/2021 |
| GB | 2340101 | B | 2/2002 |
| WO | 0007877 | A1 | 2/2000 |
| WO | 2005005253 | A1 | 1/2005 |
| WO | 2010073033 | A1 | 7/2010 |
| WO | 2019204405 | A1 | 10/2019 |

* cited by examiner

HUMAN AND/OR NON-HUMAN CARGO ATTACHMENT DEVICE FOR USE WITH A ROTORCRAFT

CROSS-REFERENCE TO RELATED APPLICATIONS

This application claims priority to European patent application No. EP 201400023.4 filed on Nov. 23, 2021, the disclosure of which is incorporated in its entirety by reference herein.

TECHNICAL FIELD

The present disclosure is related to a human and/or non-human cargo attachment device for use with a rotorcraft, which comprises at least a plurality of main lashing points for attachment of human external cargo.

BACKGROUND

Non-human cargo attachment devices for use with a rotorcraft, which are embodied to permit transport of non-human external cargo outside of the rotorcraft, may be provided in the form of hooks that are attached to ropes or cables which are connected to the rotorcraft. Such hooks may be embodied as simple hooks, safety hooks, snap hooks, or even more complicated forms of hooks. For instance, the document EP 3 781 480 A1 describes a perforated capsule hook with a perforated housing which is attachable to non-human external cargo and remains after retraction from the non-human external cargo in a comparatively stable state during high speed flight due to a plurality of holes and perforations provided in the perforated housing.

Furthermore, human and/or non-human cargo attachment devices for use with a rotorcraft, which are embodied to permit transport of human and/or non-human external cargo outside of the rotorcraft, are available in a wide range of variations and usually attachable to ropes or cables which are connected to the rotorcraft. More generally, in civil, parapublic and military missions, such ropes or cables with human and/or non-human cargo attachment devices may e.g., be used for rapidly inserting and/or extracting persons and/or cargo into/from various environments, in particular environments that do not permit landing of the rotorcraft. Such environments may e.g., include maritime environments such as offshore as well as oil and gas platforms, and terrestrial environments such as land in vegetated areas, mountains and urban territory.

In general, three different types of human and/or non-human cargo attachment devices are currently available: rigging plates or loops of so-called SPIE (Special Patrol Insertion/Extraction) rigs, personal transport nets, and personal transport platforms, all of which are attachable to associated attachment interfaces such as safety hooks or snap hooks provided at associated ropes or cables of a given rotorcraft.

More specifically, in SPIE rigs the rigging plates or loops may be distributed over the length of associated ropes in order to form lashing points for attachment of human or non-human cargo. By way of example, the documents CN 112 047 228 A, CN 205 114 816 U, EP 3 037 133 B1, GB 2 340 101 B, and U.S. Pat. No. 1,408,940 A describe illustrative ropes with rigging plates or loops that form lashing points. Other rigging plates which are configured to provide multiple lashing points and which are attachable to attachment interfaces provided at associated ropes or cables are e.g., described in the documents US 2021/0047149 A1 or EP3781480, U.S. Pat. No. 10,398,939 B1, and U.S. Pat. No. 6,336,260 B1. U.S. Pat. Nos. 5,836,548, 4,913,480 and US2013154290 were cited.

Personal transport nets, in turn, are available in a wide range of variations, as e.g., acknowledged in the document WO 2010/073033 A1, which describes that helicopter under-slung load equipment nets are well-known and widely used for transporting goods by helicopter either when there is no room in the helicopter for the goods, or when for reasons of speed or efficiency it is preferred to keep the goods outside of the helicopter. More specifically, such helicopter under-slung load equipment nets usually consist of a braided nylon net body and a plurality of lifting loops made from nylon webbing. Furthermore, each net usually comprises four pairs of lifting loops and each pair of lifting loops is provided with a hook.

Similarly, personal transport platforms are also available in a wide range of variations and e.g., described in the documents U.S. Pat. Nos. 3,476,339 A, 3,467,346 A, 3,444, 569 A, US 2005/0250396 A1, EP 1 646 562 A1, and EP 1 100 720 A1. By way of example, the document EP 1 100 720 A1 describes a personal transport platform that may be suspended from a rotorcraft for rescuing people or equipment and that forms a link between the rotorcraft and a pod capable of being folded and unfolded, which is formed by a frame associated with a flexible support, such as a net. The frame comprises, fixed to the link, a central mast connected to mobile means bearing the flexible support, for folding and unfolding the mobile means and the flexible support about the central mast.

However, none of the above-described human and/or non-human cargo attachment devices is suitable for use with a rotorcraft for inserting and/or extracting persons and/or cargo into/from forested areas.

SUMMARY

It is, therefore, an object of the present disclosure to provide a new human and/or non-human cargo attachment device which is suitable for use with a rotorcraft for inserting and/or extracting persons and/or cargo into/from forested areas.

This object is solved by a human and/or non-human cargo attachment device for use with a rotorcraft, which comprises the features of claim 1. More specifically, according to the present disclosure a human and/or non-human cargo attachment device for use with a rotorcraft comprises a mounting interface with a mounting base carrier that is removably attachable to an associated attachment for attachment to a rotorcraft rope or cable, a connecting member that is spaced apart from the mounting base carrier, and a plurality of lateral attachments which are connected to the mounting base carrier and the connecting member. The plurality of lateral attachments, the mounting base carrier, and the connecting member form a device body with a height direction. The connecting member is spaced apart from the mounting base carrier in the height direction of the device body. Each lateral attachment of the plurality of lateral attachments forms a main lashing point for attachment of human external cargo and comprises an associated inner web that is connected to the mounting base carrier and the connecting member. The associated inner webs of the plurality of lateral attachments are spaced apart from each other in peripheral direction of the mounting base carrier and form a tube-shaped inner region extending in height direction of the device body.

Advantageously, the inventive human and/or non-human cargo attachment device is suitable for use with a rotorcraft in forested areas and enables a fast and simple insertion/extraction of up to ten or even more persons into/from such forested areas, as well as any other potential application environment. This is mainly achieved by forming the device body of the human and/or non-human cargo attachment device with a dedicated penetrating design, preferably with an arrowhead shape.

Furthermore, the device body is preferably embodied with a redundant design and provides at least one additional lashing point for each main lashing point for attachment of human external cargo. Moreover, any interior chambers of the device body may be filled with foam to achieve an increased floatability which is required to enable application in sea insertion/extraction.

Advantageously, the device body preferably forms a single, compact and central point for insertion/extraction, which allows for interaction of transported persons during transportation. Furthermore, lifting and drop-off of transported persons and/or cargo in a single step is enabled.

In particular, the device body is lightweight and preferably manufactured by means of 3D printing, preferentially by means of a 3D titanium printing process. Such a 3D titanium printing process enables manufacturing of a 3D printed titanium device body with an integral design which, in an illustrative realization, may weigh only approximately 7 kg while allowing transportation of up to ten persons, each having a weight of up to 150 kg, as well as a non-human load of up to 500 kg in addition thereto. Advantageously, such a 3D printed titanium device body may be manufactured at comparatively low cost.

More specifically, in an illustrative realization the human and/or non-human cargo attachment device comprises a star-shaped device body with ten main lashing points which are provided with associated redundancies with enough distance between them in order to avoid snap hook respectively carabiner interactions. As the ten main lashing points are provided with associated redundancies, this allows usage of a 3D printing process. These ten main lashing points are preferably provided at reinforcement ribs of the device body in order to transmit occurring lateral loads. Preferably, the star-shaped device body exhibits an arrowhead form in order to be able to penetrate e.g., through trees in forested areas. Inside the star-shaped device body there is a standard forged half link on which non-human cargo may be attached. The star-shaped device body may preferably be attached to a rope or cable of a rotorcraft by means of another standard forged half link, which preferentially forms a full link with the standard forged half link on which non-human cargo may be attached. The attachment of each one of these standard forged half links to the star-shaped device body may be realized with standard bolts which are preferably locked by castellated nuts. Moreover, splint pins may be used to secure the castellated nuts. In addition, a required floatability of the star-shaped device body may be improved by filling its interior with foam. Furthermore, additional floats can be attached to the star-shaped device body, e.g., at selected main lashing points.

According to some aspects, each lateral attachment of the plurality of lateral attachments extends in an associated extension plane, wherein the associated extension planes of the plurality of lateral attachments are spaced apart from each other in the peripheral direction of the mounting base carrier.

According to some aspects, each lateral attachment of the plurality of lateral attachments comprises an upper web and a lower web which are interconnected in an angled arrangement at an associated interconnection region and which are further connected to the associated inner web of the lateral attachment.

According to some aspects, the upper web, the lower web, and the associated inner web of each lateral attachment of the plurality of lateral attachments form a triangular structure in the associated extension plane of the lateral attachment.

According to some aspects, the main lashing point of each lateral attachment of the plurality of lateral attachments is arranged in the associated interconnection region of the lateral attachment.

According to some aspects, each lateral attachment of the plurality of lateral attachments forms a redundant lashing point for an additional attachment of the human external cargo.

According to some aspects, the redundant lashing point of the lateral attachment is arranged in the associated interconnection region of the lateral attachment.

According to some aspects, the mounting base carrier is further removably attachable inside the tube-shaped inner region to an additional attachment for attachment of non-human external cargo.

According to some aspects, the mounting base carrier is at least equipped with two mounting lugs which are attachable by means of a mounting bolt to the additional attachment.

According to some aspects, the mounting base carrier is plate-shaped, wherein the associated inner webs are connected to an outer circumference of the mounting base carrier, and wherein the mounting base carrier and the plurality of lateral attachments form a star-shaped arrangement in radial direction of the mounting base carrier.

According to some aspects, the plurality of lateral attachments is further interconnected via associated stiffening ribs.

According to some aspects, the mounting base carrier is at least equipped with three mounting lugs which are attachable by means of a mounting bolt to an associated attachment for attachment to a rotorcraft rope or cable.

According to some aspects, the device body is 3D printed, preferably by means of a 3D titanium printing process.

According to some aspects, the device body forms a confined space outside the tube-shaped inner region, wherein the confined space is filled with foam.

According to some aspects, a plurality of redundancy cables or ropes is routed inside the device body to guarantee secure functioning of the device body at least upon breakage of one or more of the plurality of lateral attachments.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
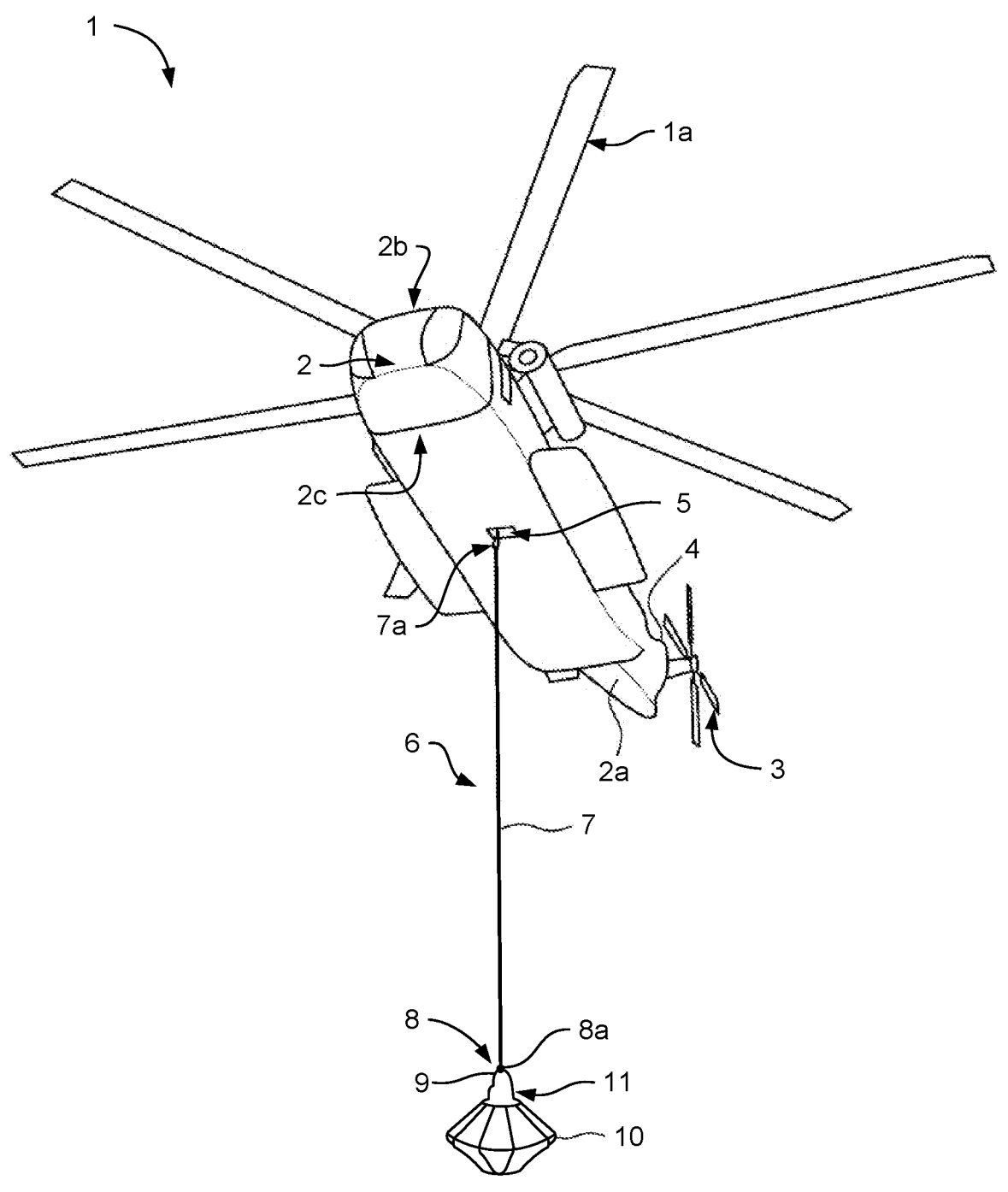
FIG. 1 shows a perspective view of a rotorcraft with a human and/or non-human cargo attachment device according to the present disclosure.

FIG. 1 shows a rotorcraft 1 that illustratively comprises a fuselage 2 with a bottom shell 2c. By way of example, the fuselage 2 forms a cabin 2b for passengers and/or cargo and a tail boom 2a is mounted to the fuselage 2.

The rotorcraft 1 illustratively further comprises at least one main rotor 1a configured to provide lift and forward or backward thrust during operation, and at least one counter-torque device 3 configured to provide counter-torque during operation, i.e., to counter the torque created by rotation of the at least one main rotor 1a for purposes of balancing the rotorcraft 1 in terms of yaw.

The at least one counter-torque device 3 is illustratively provided at an aft section of the tail boom 2a, which preferably further comprises a fin 4. However, it should be noted that the at least one counter-torque device 3, as well as the fin 4 provided at the aft section of the tail boom 2a, are merely described for illustrating one possible realization of the rotorcraft 1.

According to one aspect, the rotorcraft 1 is provided with human and/or non-human cargo insertion/extraction means 6. By way of example, the human and/or non-human cargo insertion/extraction means 6 are attached to an associated attachment 5 provided at the bottom shell 2c. The attachment 5 is illustratively embodied as an attachment ring which may e.g., be connected to a cable that is coupled to a winch.

More specifically, the human and/or non-human cargo insertion/extraction means 6 preferably comprises a rope 7 with a rope interface 7a, such as an eyelet, which is illustratively attached to the attachment 5, e.g., by means of a snap hook respectively carabiner. The rope 7 is preferably provided with an attachment interface 8, such as a safety hook or snap hook respectively carabiner 8a. The attachment interface 8 is preferably provided to enable a secure and reliable attachment of external components to the rope 7. In a variant, the rope 7 is replaced by a cable.

By way of example, an attachment 9 of a human and/or non-human cargo attachment device 10 is attached to the attachment interface 8. Illustratively, the attachment 9 is mounted to the human and/or non-human cargo attachment device 10 at an associated mounting interface 11. The attachment 9 may be implemented by means of a standard forged half link. The human and/or non-human cargo attachment device 10 and/or its constituent components are further described below with reference to FIG. 2 to FIG. 6.

Illustratively, the rotorcraft 1 with the human and/or non-human cargo insertion/extraction means 6 is shown in operation. In this illustrative operation, the human and/or non-human cargo insertion/extraction means 6 may e.g., be used for inserting/extracting persons, i.e., human cargo, and/or goods and loads, i.e., non-human cargo, into/from a respective environment.

By way of example, the rotorcraft 1 is embodied as a helicopter. However, use of the human and/or non-human cargo insertion/extraction means 6 is not limited to use with a helicopter. Instead, the human and/or non-human cargo insertion/extraction means 6 may at least be used with other rotorcrafts, such as e.g., tiltrotor aircrafts, compound helicopters, multicopters and so on.

Figure 2:
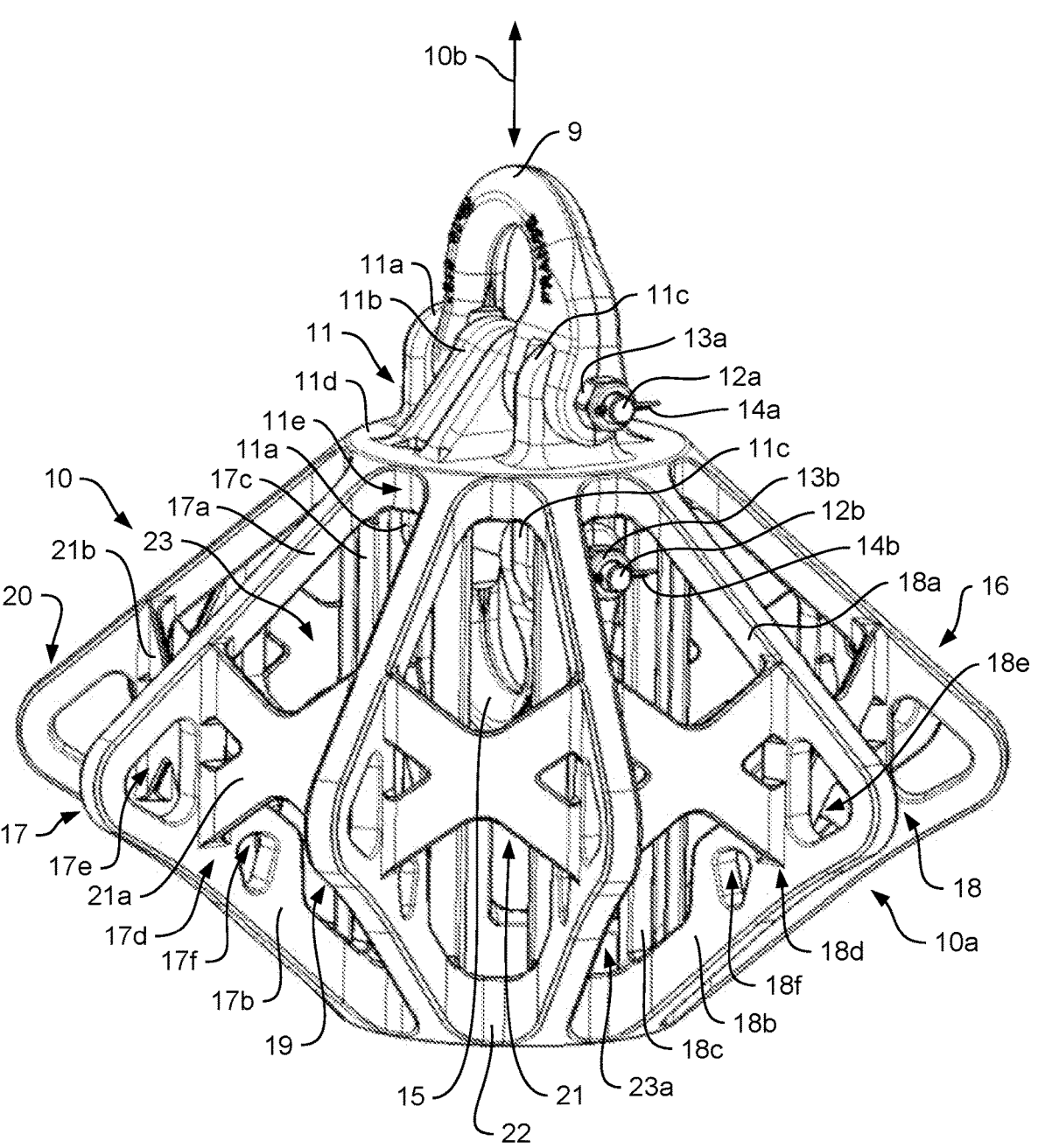
FIG. 2 shows a perspective view of the human and/or non-human cargo attachment device of FIG. 1.

FIG. 2 shows the human and/or non-human cargo attachment device 10 with the attachment 9 and the mounting interface 11 of FIG. 1. For simplicity and brevity, the human and/or non-human cargo attachment device 10 is hereinafter merely referred to as the "cargo attachment device 10".

Illustratively, the cargo attachment device 10 comprises a device body 10a with a height direction 10b. The device body 10a includes a connecting member 22 and a mounting base carrier 11d having an outer circumference 11e. By way of example, the connecting member 22 is ring-shaped and the mounting base carrier 11d is plate-shaped.

The mounting base carrier 11d is illustratively integrated into the mounting interface 11 for attachment to a rotorcraft rope or cable via a suitable attachment interface, e.g., the attachment interface 8 provided at the rotorcraft rope 7 of FIG. 1. Preferably, the mounting base carrier 11d is removably attachable to an associated attachment, illustratively the attachment 9, for attachment to the suitable attachment interface, e.g., the attachment interface 8 provided at the rotorcraft rope 7 of FIG. 1.

The mounting base carrier 11d is preferably at least equipped with three mutually redundant mounting lugs 11a, 11b, 11c, which are associated with the mounting interface 11 and which are, by way of example, attached to the attachment 9 by means of a mounting bolt 12a, in particular by means of a standard bolt. Illustratively, the mounting bolt 12a is retained in the mounting lugs 11a, 11b, 11c and the attachment 9 by means of a castellated nut 13a. The castellated nut 13a may further be secured in the mounting bolt 12a, e.g., by means of a splint pin 14a.

Illustratively, the mounting base carrier 11d is spaced apart from the connecting member 22. Preferably, the connecting member 22 is spaced apart from the mounting base carrier 11d in the height direction 10b of the device body 10a. The device body 10a includes a plurality of lateral attachments 16 which are connected to the mounting base carrier 11d and the connecting member 22.

The device body 10a may be formed in the shape of an arrowhead, as illustrated. Such an arrowhead-shaped form provides for a penetrating design, which is particularly advantageous for use of the cargo attachment device 10 in forested areas, as it enables the device body 10a to penetrate through the trees in the forested areas with minimal resistance. Preferably, the device body 10a is 3D printed, preferably by means of a 3D titanium printing process.

In order to stiffen the device body 10a, the plurality of lateral attachments 16 may be interconnected via associated stiffening ribs 21 which are preferably provided in order to transfer lateral loads. More specifically, for simplicity and clarity of the drawing only four lateral attachments 17, 18, 19, 20 of the plurality of lateral attachments 16 are individually labeled. Illustratively, the lateral attachments 19, 20 are immediately neighboring the lateral attachment 17 in peripheral direction (11f in FIG. 5) of the mounting base carrier 11d. By way of example, the lateral attachment 17 is connected to the lateral attachment 19 via a stiffening rib 21a, and the lateral attachment 17 is connected to the lateral attachment 20 via a stiffening rib 21b. By way of example, the stiffening ribs 21a, 21b are X-shaped.

At least one and, preferably, each lateral attachment of the plurality of lateral attachments 16 forms a main lashing point for attachment of human external cargo and comprises an associated inner web that is connected to the mounting base carrier 11d and the connecting member 22. The associated inner webs of the plurality of lateral attachments 16 are spaced apart from each other in peripheral direction (11*f* in FIG. 5) of the mounting base carrier 11*d* and form a tube-shaped inner region 23*a* extending in the height direction 10*b* of the device body 10*a*.

By way of example, only the two lateral attachments 17, 18 are described in more detail hereinafter representative for all lateral attachments of the plurality of lateral attachments 16, for simplicity and clarity of the description. The lateral attachments 17, 18 illustratively form the main lashing points 17*e*, 18*e*, in particular carabiner or snap hook main lashing points 17*e*, 18*e*, for attachment of human external cargo, and comprise inner webs 17*c*, 18*c* which are connected to the mounting base carrier 11*d* and the connecting member 22. By way of example, the inner webs 17*c*, 18*c* are spaced apart from each other in the peripheral direction (11*f* in FIG. 5) of the mounting base carrier 11*d* and form the tube-shaped inner region 23*a* extending in the height direction 10*b* of the device body 10*a*.

Preferably, the mounting base carrier 11*d* is removably attachable, and illustratively attached, inside the tube-shaped inner region 23*a* to an additional attachment 15 for attachment of non-human external cargo. The additional attachment 15 may be implemented by means of a standard forged half link. Outside the tube-shaped inner region 23*a*, the device body 10*a* preferably forms a confined space 23. The confined space 23 may be filled with foam such that the device body 10*a* forms a buoy with a predefined floatability.

Figure 4:
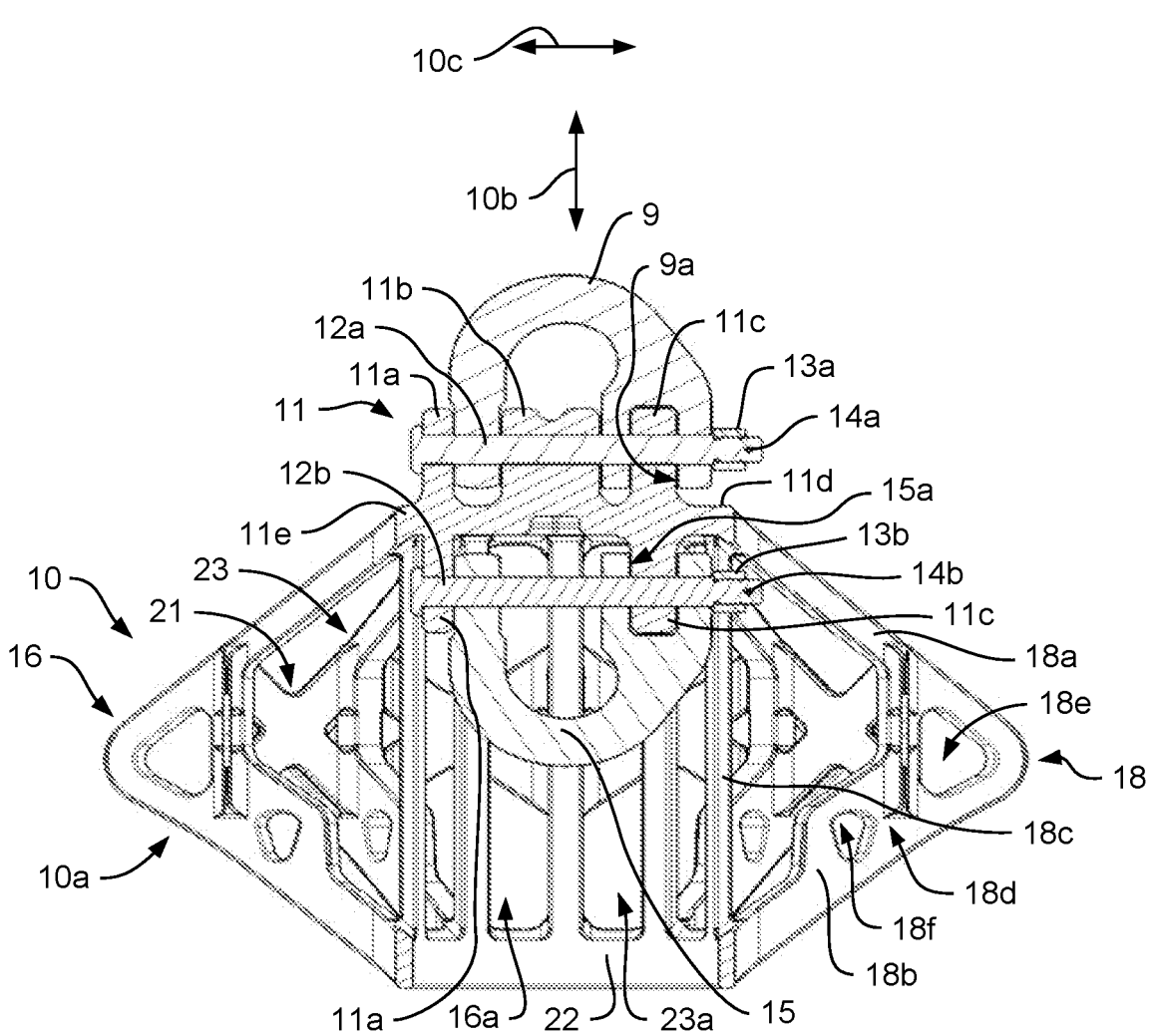
FIG. 4 shows a sectional view of the human and/or non-human cargo attachment device of FIG. 2 and FIG. 3.

Furthermore, the mounting base carrier 11*d* is preferably at least equipped with two additional mounting lugs which are preferentially embodied similar to the lugs 11*a*, 11*c*, but arranged on an opposed side of the mounting base carrier 11*d*, i.e., on a side of the mounting base carrier 11*d* that faces the tube-shaped inner region 23*a*, as illustrated in more detail in FIG. 4. Therefore, the two additional mounting lugs are also labelled with the reference signs 11*a*, 11*c* and they are referred to as the "additional mounting lugs 11*a*, 11*c*" hereinafter, for simplicity. The additional mounting lugs 11*a*, 11*c* are associated with the mounting interface 11 and they are, by way of example, attached to the additional attachment 15 by means of a mounting bolt 12*b*, in particular by means of a standard bolt 12*b*. Illustratively, the mounting bolt 12*b* is retained in the additional mounting lugs 11*a*, 11*c* and the additional attachment 15 by means of a castellated nut 13*b*. The castellated nut 13*b* may further be secured in the mounting bolt 12*b*, e.g., by means of a splint pin 14*b*.

The mounting base carrier 11*d* is further preferably connected at its outer circumference 11*e* to upper webs of the plurality of lateral attachments 16. More specifically, the lateral attachments 17, 18 illustratively comprise upper webs 17*a*, 18*a* and lower webs 17*b*, 18*b*, wherein the upper webs 17*a*, 18*a* are connected to the outer circumference 11*e* of the mounting base carrier 11*d*.

The upper webs 17*a*, 18*a*, and the lower webs 17*b*, 18*b* are preferably interconnected in an angled arrangement at associated interconnection regions 17*d*, 18*d* and are further connected to the inner webs 17*c*, 18*c* of the lateral attachments 17, 18. Preferably, the upper webs 17*a*, 18*a*, the lower webs 17*b*, 18*b*, and the associated inner webs 17*c*, 18*c* of the lateral attachments 17, 18 form a triangular structure in associated extension planes (17*g*, 18*g* in FIG. 5) of the lateral attachments 17, 18. By way of example, the interconnection regions 17*d*, 18*d* are plate-shaped.

More specifically, the interconnection regions 17*d*, 18*d* preferably include the main lashing points 17*e*, 18*e* of the lateral attachments 17, 18, which are provided for attachment of human external cargo. Furthermore, the lateral attachments 17, 18 illustratively form redundant lashing points 17*f*, 18*f*, in particular carabiner or snap hook redundant lashing points 17*f*, 18*f*, for additional or redundant attachments of the human external cargo. The redundant lashing points 17*f*, 18*f* are preferably also arranged in the interconnection regions 17*d*, 18*d*. Furthermore, the redundant lashing points 17*f*, 18*f* are preferably sufficiently spaced apart from the main lashing points 17*e*, 18*e* in the respective interconnection regions 17*d*, 18*d* to avoid carabiner or snap hook interactions.

Figure 3:
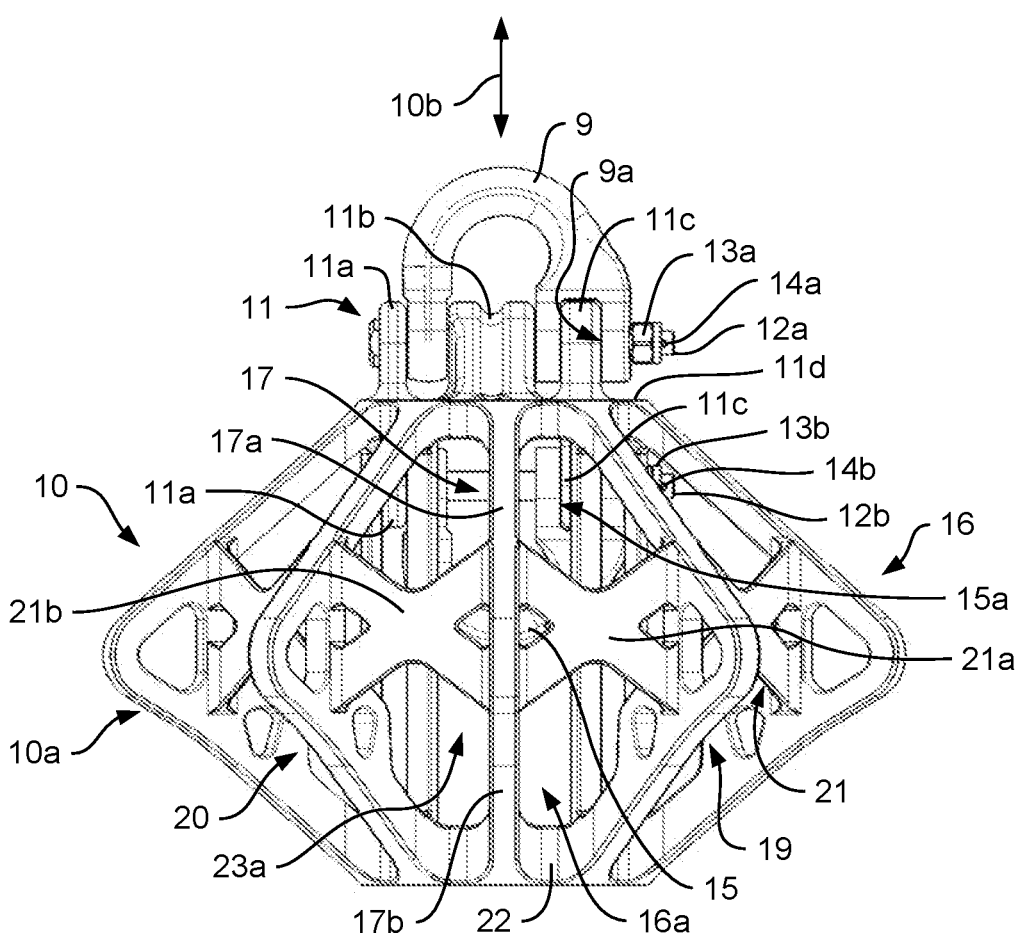
FIG. 3 shows a front view of the human and/or non-human cargo attachment device of FIG. 2.

FIG. 3 shows the cargo attachment device 10 with the device body 10*a*, the plurality of lateral attachments 16, the attachment 9, as well as the additional attachment 15 of FIG. 2. The attachment 9 is illustratively attached to the mounting lugs 11*a*, 11*b*, 11*c* provided on a first—in FIG. 3 upper—side of the mounting base carrier 11*d* of FIG. 2, and the additional attachment 15 is illustratively attached to the additional mounting lugs 11*a*, 11*c* provided on an opposed second—in FIG. 3 lower—side of the mounting base carrier 11*d*.

As described above at FIG. 2, the attachment 9 may be embodied as a standard forged half link. This standard forged half link is illustratively C-shaped and comprises a fork-shaped accommodation 9*a* at one end, which illustratively accommodates the mounting lug 11*c*. At its other end, the C-shaped standard forged half link is illustratively accommodated in a fork-shaped accommodation formed by the mounting lugs 11*a*, 11*b*, for redundancy purposes.

As also described above at FIG. 2, the additional attachment 15 may likewise be embodied as a standard forged half link. This standard forged half link is also illustratively C-shaped and comprises a fork-shaped accommodation 15*a* at one end, which illustratively accommodates the additional mounting lug 11*c*, and at the other end it merely abuts the additional mounting lug 11*a*.

FIG. 3 further illustrates spacings 16*a* between the inner webs of the plurality of lateral attachments 16, which form the tube-shaped inner region 23*a*. In other words, the tube-shaped inner region 23*a* is encompassed by a sleeve having a plurality of lateral windows or openings formed by the spacings 16*a* which are arranged between the inner webs of the plurality of lateral attachments 16.

FIG. 4 shows the cargo attachment device 10 with the device body 10*a*, the plurality of lateral attachments 16, the attachment 9, as well as the additional attachment 15 of FIG. 2 and FIG. 3. The attachment 9 is illustratively attached to the mounting lugs 11*a*, 11*b*, 11*c* of the mounting base carrier 11*d* of FIG. 2 and FIG. 3, and the additional attachment 15 is illustratively attached to the additional mounting lugs 11*a*, 11*c* of the mounting base carrier 11*d*.

FIG. 4 further illustrates arrangement of the additional attachment 15 inside the tube-shaped inner region 23*a* of FIG. 2 and FIG. 3. FIG. 4 likewise further illustrates the fork-shaped accommodations 9*a*, 15*a* of the attachment 9 and the additional attachment 15, which accommodate the mounting lug 11*c* and the additional mounting lug 11*c*, as well as the other ends of the attachment 9 and the additional attachment 15, which are accommodated in the fork-shaped accommodation formed by the mounting lugs 11*a*, 11*b* or merely abutting the additional mounting lug 11*a*, respectively.

Moreover, the device body 10*a* is illustratively shown with a radial direction 10*c*. Preferably, each one of the plurality of lateral attachments 16 extends radially, i.e., in the radial direction 10*c*, and, thus, comprises a radially extended interconnection region.

By way of example, the plate-shaped interconnection region 18*d* of the lateral attachment 18 of FIG. 2 is shown in greater detail with the main lashing point 18*e* and the redundant lashing point 18*f*. Furthermore, the preferred triangular structure of the lateral attachment 2, as described above at FIG. 2, is illustrated in greater detail.

Figure 5:
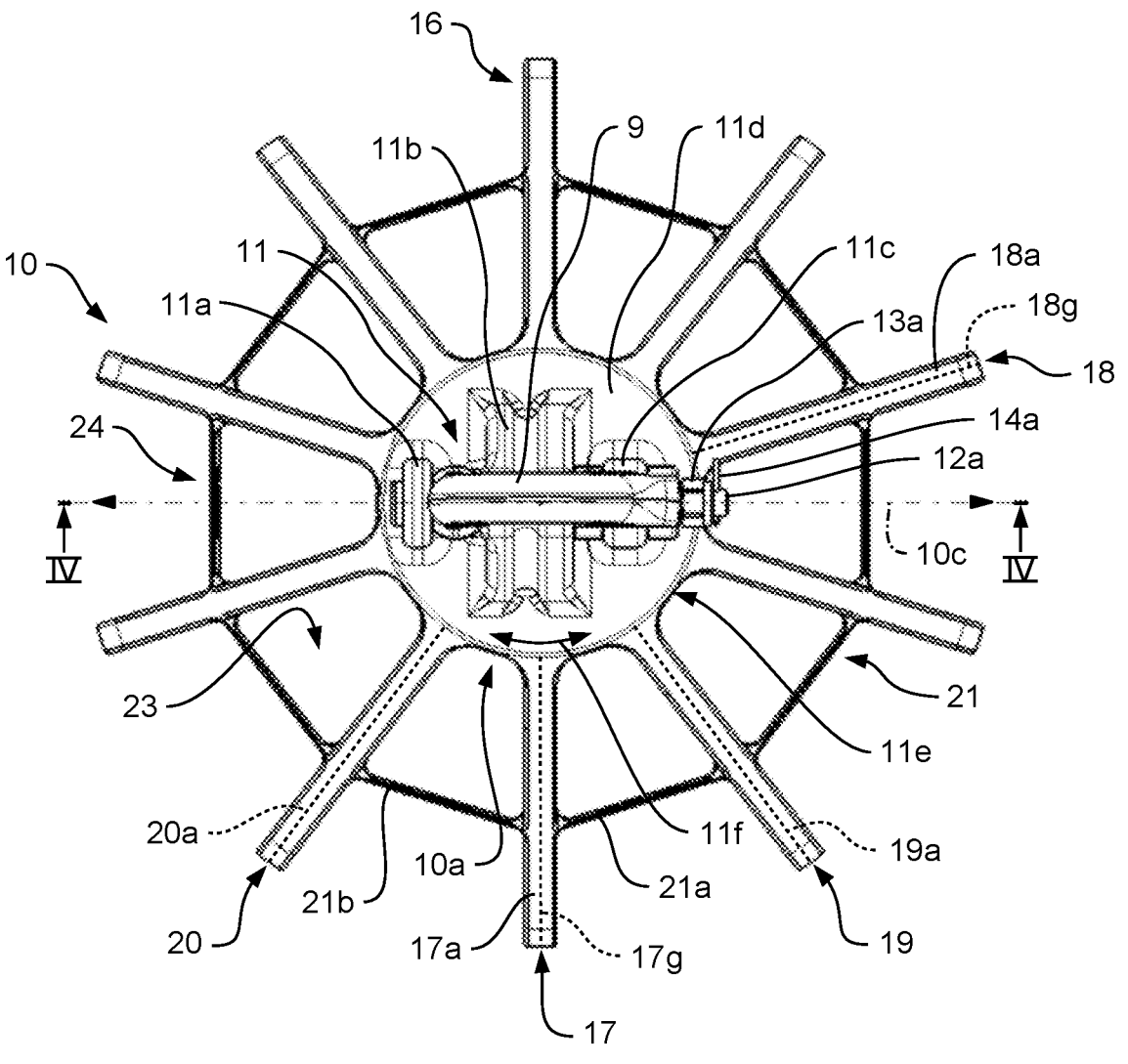
FIG. 5 shows a top view of the human and/or non-human cargo attachment device of FIG. 2 to FIG. 4.

FIG. 5 shows the cargo attachment device 10 with the device body 10*a*, the plurality of lateral attachments 16, and the attachment 9 of FIG. 2 to FIG. 4. The attachment 9 is illustratively attached to the mounting lugs 11*a*, 11*b*, 11*c* of the mounting base carrier 11*d* of FIG. 2 to FIG. 4. The mounting base carrier 11*d* is illustratively shown with its outer circumference 11*e* and a peripheral direction 11*f*, and the device body 10*a* is illustratively shown with its radial direction 10*c* according to FIG. 4.

As described above at FIG. 2, the mounting base carrier 11*d* is preferably plate-shaped and illustratively forms with the plurality of lateral attachments 16 a star-shaped arrangement in the radial direction 10*c*. Furthermore, as described above at FIG. 4, each one of the plurality of lateral attachments 16 preferably extends radially, i.e., in the radial direction 10*c*.

More specifically, each one of the plurality of lateral attachments 16 illustratively extends in an associated extension plane, and the associated extension planes are preferably spaced apart from each other in the peripheral direction 11*f* of the mounting base carrier 11*d*. By way of example, the lateral attachments 17, 18, 19, 20 of FIG. 2 are shown with associated extension planes 17*g*, 18*g*, 19*a*, 20. The lateral attachments 19, 20 are immediately neighboring the lateral attachment 17, and their associated extension planes 19*a*, 20*a* are respectively spaced apart from the associated extension plane 17*g* of the lateral attachment 17 in the peripheral direction 11*f* of the mounting base carrier 11*d*.

FIG. 5 further illustrates the plurality of stiffening ribs 21 with the stiffening ribs 21*a*, 21*b* of FIG. 2. Illustratively, the plurality of stiffening ribs 21 forms a stiffening ring 24.

Figure 6:
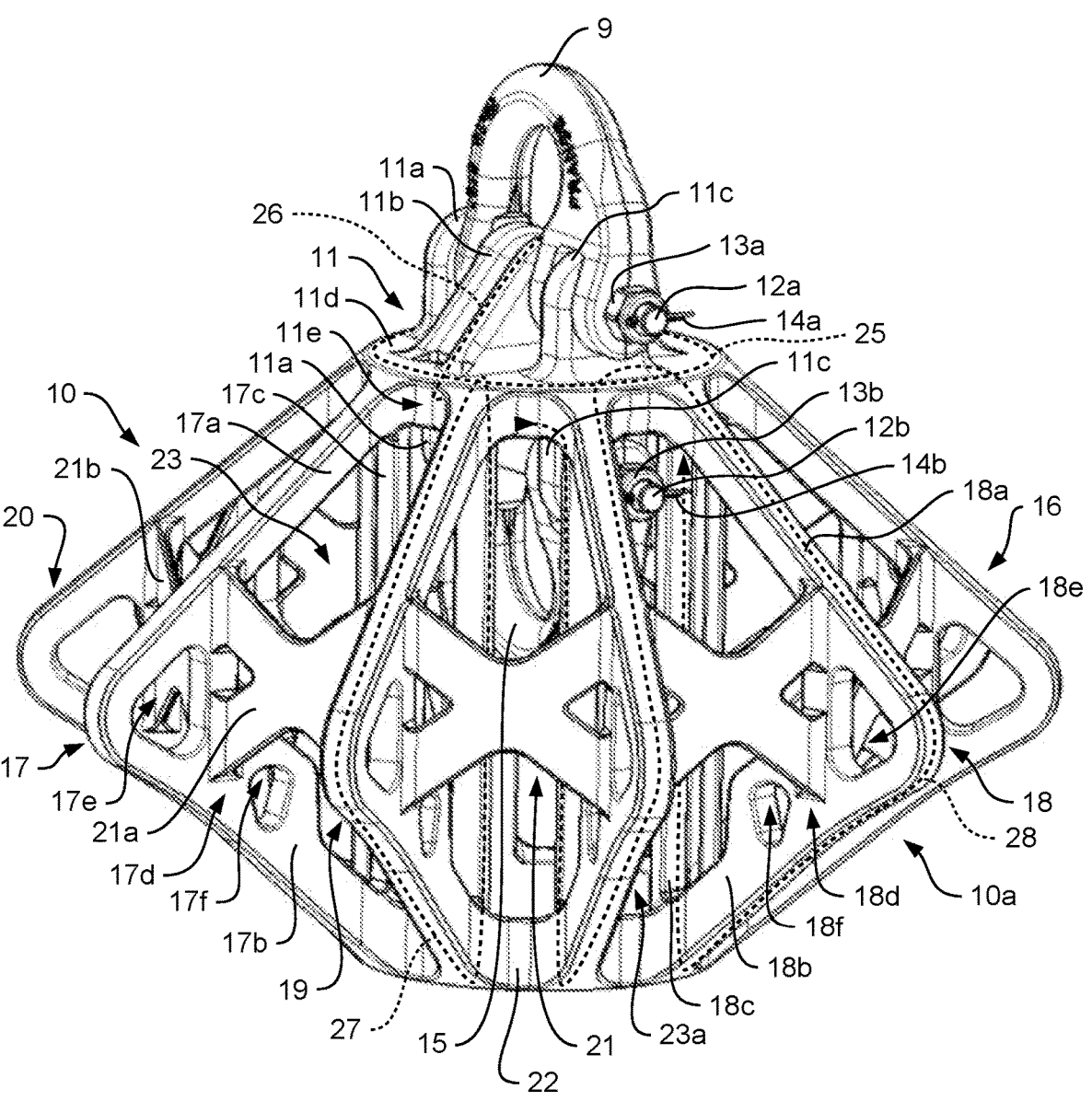
FIG. 6 shows a perspective view of the human and/or non-human cargo attachment device of FIG. 2 to FIG. 5 with embedded redundancy cables or ropes.

FIG. 6 shows the cargo attachment device 10 with the device body 10*a*, the plurality of lateral attachments 16 with the lateral attachments 17, 18, and the attachment 9 of FIG. 2 to FIG. 5. The attachment 9 is illustratively attached to the mounting lugs 11*a*, 11*b*, 11*c* of the mounting base carrier 11*d* of FIG. 2 to FIG. 5.

However, in contrast to FIG. 2 to FIG. 5, the device body 10*a* is now provided with a plurality of redundancy cables or ropes 25, 26, 27, 28. Preferably, the plurality of redundancy cables or ropes 25, 26, 27, 28 is routed inside the device body 10*a* to guarantee secure functioning of the device body 10*a* at least upon breakage of one or more of the plurality of lateral attachments 16.

The redundancy cables or ropes 25, 26, 27, 28 may be approved steel or textile cables or ropes. Preferably, the redundancy cables or ropes 25, 26, 27, 28 are directly incorporated, i.e., embedded into the device body 10*a* during manufacturing thereof by means of a 3D titanium printing process. Alternatively, the redundancy cables or ropes 25, 26, 27, 28 may be placed in channels or cavities formed in the device body 10*a*.

More specifically, the redundancy ropes or cables 25, 26, 27, 28 are preferably routed in the device body 10*a* such that they form at least loops around each provided main lashing point, e.g., the main lashing points 17*e*, 18*e* of the lateral attachments 17, 18, wherein the loops are securely and reliably connected to the attachment 9. This may be achieved by means of separate loops for each one of the plurality of lateral attachments 16, or by means of a suitably routed single redundancy rope or cable.

At this point, it should be noted that modifications to the above-described realizations are within the common knowledge of the person skilled in the art and, thus, also considered as being part of the present disclosure. For instance, although it is mentioned that the inventive cargo attachment device 10 is preferably embodied by means of a 3D titanium printing process, it may likewise be machined or casted so that fewer redundancies, such as e.g., the redundant lashing points or redundancy cables or ropes, would be required.

REFERENCE LIST

1 rotorcraft
1*a* main rotor
2 fuselage
2*a* tail boom
2*b* cabin
2*c* bottom shell
3 counter-torque device
4 fin
5 rope attachment
6 human and/or non-human cargo insertion/extraction means
7 rope
7*a* rope interface
8 attachment interface
8*a* snap hook
9 device attachment
9*a* fork-shaped accommodation
10 human and/or non-human cargo attachment device
10*a* arrowhead-shaped device body
10*b* vertical or height direction
10*c* horizontal or radial direction
11 mounting interface
11*a*, 11*b*, 11*c* mounting lugs
11*d* mounting base carrier
11*e* mounting base carrier outer circumference
11*f* mounting base carrier peripheral direction
12*a*, 12*b* mounting bolts
13*a*, 13*b* castellated nuts
14*a*, 14*b* splint pins
15 central non-human cargo attachment
15*a* fork-shaped accommodation
16 lateral human cargo attachments
16*a* spacings
17 individual lateral human cargo attachment
17*a*, 17*b*, 17*c* attachment webs
17*d* plate-shaped interconnection region
17*e* main lashing point
17*f* redundant lashing point
17*g* attachment extension plane
18 individual lateral human cargo attachment
18*a*, 18*b*, 18*c* attachment webs
18*d* plate-shaped interconnection region
18*e* main lashing point
18*f* redundant lashing point
18*g* attachment extension plane
19, 20 peripherally adjacent lateral human cargo attachments
19*a*, 20*a* attachment extension planes
21 plurality of stiffening ribs
21*a*, 21*b* individual stiffening ribs
22 ring-shaped connecting member
23 confined space
23*a* tube-shaped inner region
24 stiffening ring
25, 26, 27, 28 redundancy cables/ropes

What is claimed is:

1. A human and/or non-human cargo attachment device for use with a rotorcraft, comprising:

a mounting interface with a mounting base carrier that is removably attachable to an associated attachment for attachment to a rotorcraft rope or cable;

a connecting member that is spaced apart from the mounting base carrier; and a plurality of lateral attachments which are connected to the mounting base carrier and the connecting member;

wherein the plurality of lateral attachments, the mounting base carrier, and the connecting member form a device body with a height direction;

wherein the connecting member is spaced apart from the mounting base carrier in the height direction of the device body;

wherein each lateral attachment of the plurality of lateral attachments forms a main lashing point for attachment of human external cargo and comprises an associated inner web that is connected to the mounting base carrier and the connecting member; and wherein the associated inner webs of the plurality of lateral attachments are spaced apart from each other in peripheral direction of the mounting base carrier and form a tube-shaped inner region extending in height direction of the device body.

2. The human and/or non-human cargo attachment device of claim 1, wherein each lateral attachment of the plurality of lateral attachments extends in an associated extension plane, and wherein the associated extension planes of the plurality of lateral attachments are spaced apart from each other in the peripheral direction of the mounting base carrier.

3. The human and/or non-human cargo attachment device of claim 2, wherein each lateral attachment of the plurality of lateral attachments comprises an upper web and a lower web which are interconnected in an angled arrangement at an associated interconnection region and which are further connected to the associated inner web of the lateral attachment.

4. The human and/or non-human cargo attachment device of claim 3, wherein the upper web, the lower web, and the associated inner web of each lateral attachment of the plurality of lateral attachments form a triangular structure in the associated extension plane of the lateral attachment.

5. The human and/or non-human cargo attachment device of claim 3, wherein the main lashing point of each lateral attachment of the plurality of lateral attachments is arranged in the associated interconnection region of the lateral attachment.

6. The human and/or non-human cargo attachment device of claim 3, wherein each lateral attachment of the plurality of lateral attachments forms a redundant lashing point for an additional attachment of the human external cargo.

7. The human and/or non-human cargo attachment device of claim 6, wherein the redundant lashing point of the lateral attachment is arranged in the associated interconnection region of the lateral attachment.

8. The human and/or non-human cargo attachment device of claim 1, wherein the mounting base carrier is further removably attachable inside the tube-shaped inner region to an additional attachment for attachment of non-human external cargo.

9. The human and/or non-human cargo attachment device of claim 8, wherein the mounting base carrier is at least equipped with two mounting lugs which are attachable by means of a mounting bolt to the additional attachment.

10. The human and/or non-human cargo attachment device of claim 1, wherein the mounting base carrier is plate-shaped, wherein the associated inner webs are connected to an outer circumference of the mounting base carrier, and wherein the mounting base carrier and the plurality of lateral attachments form a star-shaped arrangement in radial direction of the mounting base carrier.

11. The human and/or non-human cargo attachment device of claim 1, wherein the plurality of lateral attachments is further interconnected via associated stiffening ribs.

12. The human and/or non-human cargo attachment device of claim 1, wherein the mounting base carrier is at least equipped with three mounting lugs which are attachable by means of a mounting bolt to an associated attachment for attachment to a rotorcraft rope or cable.

13. The human and/or non-human cargo attachment device of claim 1, wherein the device body is 3D printed, preferably by means of a 3D titanium printing process.

14. The human and/or non-human cargo attachment device of claim 1, wherein the device body forms a confined space outside the tube-shaped inner region, and wherein the confined space is filled with foam.

15. The human and/or non-human cargo attachment device of claim 1, wherein a plurality of redundancy cables or ropes is routed inside the device body to guarantee secure functioning of the device body at least upon breakage of one or more of the plurality of lateral attachments.

* * * * *